(12) United States Patent
Ji et al.

(10) Patent No.: US 11,074,847 B2
(45) Date of Patent: Jul. 27, 2021

(54) SWITCH TIMING CONTROLLING CIRCUIT, SWITCH TIMING CONTROLLING METHOD AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Bin Ji, Beijing (CN); Tianma Li, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/945,227

(22) Filed: Jul. 31, 2020

(65) Prior Publication Data

US 2021/0090483 A1 Mar. 25, 2021

(30) Foreign Application Priority Data

Sep. 25, 2019 (CN) .......................... 201910912363.5

(51) Int. Cl.
*G09G 3/20* (2006.01)
(52) U.S. Cl.
CPC ............. *G09G 3/20* (2013.01); *B60K 2370/52* (2019.05); *G09G 2310/061* (2013.01); *G09G 2310/08* (2013.01)
(58) Field of Classification Search
CPC ...... G09G 3/36; G09G 3/3677; G09G 3/3696; G09G 2310/0213; G09G 2310/0286; G09G 2310/08; G09G 2330/021; G09G 2330/023; G09G 3/3614; G09G 3/20; G09G 2310/061; G09G 3/3225; G09G 3/3233; G09G 2300/0814; G09G 2300/0819; G09G 2300/0842; G09G 2300/0861; G09G 2310/0251; G09G 2320/0233; G09G 2320/0257; G09G 2320/043; G09G 2320/045; G11C 19/28; B60K 2370/52

See application file for complete search history.

(56) References Cited

U.S. PATENT DOCUMENTS

| | | | |
|---|---|---|---|
| 2007/0216634 A1* | 9/2007 | Kim ...................... | G09G 3/3677 345/100 |
| 2016/0246418 A1* | 8/2016 | Wang ...................... | G11C 19/28 |
| 2017/0076680 A1* | 3/2017 | Li ............................ | G09G 3/20 |

* cited by examiner

*Primary Examiner* — Nelson M Rosario
(74) *Attorney, Agent, or Firm* — Nath, Goldberg & Meyer; Joshua B. Goldberg (57) ABSTRACT

A switch timing controlling circuit includes a first timing controlling circuit including a first inverting sub-circuit configured to form a first inverting signal that is inverted from an initial signal having a first level as an inactive level and a second level as an active level input from an initial signal terminal; a first delaying sub-circuit configured to delay a time point of the first inverting signal at which the first inverting signal changes from the first level to the second level to form a first delaying signal; and a second inverting sub-circuit configured to form a reset signal inverted from the first delaying signal; and a second timing controlling circuit including a second delaying sub-circuit configured to delay a time point of the initial signal at which the initial signal changes from the first level to the second level to form a display control signal.

16 Claims, 3 Drawing Sheets

SWITCH TIMING CONTROLLING CIRCUIT, SWITCH TIMING CONTROLLING METHOD AND DISPLAY DEVICE

CROSS REFERENCE TO RELATED APPLICATIONS

The present disclosure claims priority to Chinese patent application No. 201910912363.5, filed on Sep. 25, 2019, in the China National Intellectual Property Administration, the disclosure of which is incorporated herein by reference in its entirety.

TECHNICAL FIELD

The present disclosure belongs to the field of display technology, and more particularly, relates to a switch timing controlling circuit, a switch timing controlling method and a display device.

BACKGROUND

When an on-vehicle display device operates, a reset signal RST and a display control signal STB are generally used for driving the on-vehicle display device to be turned on or turned off. This requires a system side of the on-vehicle display device to allocate at least two control ports to a displaying sub-circuit for transmitting control signals. However, many on-vehicle display devices can provide only one control port, and thus can control only one of the reset signal RST and the display control signal STB. However, simply adding a delaying circuit or a resetting chip into the on-vehicle display device may only delay a signal, and switch timing meeting requirements of the on-vehicle display device cannot be obtained.

SUMMARY

An aspect of the present disclosure provides a switch timing controlling circuit, and the circuit includes a first timing controlling circuit and a second timing controlling circuit. The first timing controlling circuit includes a first inverting sub-circuit configured to form a first inverting signal that is inverted from an initial signal input from an initial signal terminal, a first delaying sub-circuit configured to delay a time point of the first inverting signal at which the first inverting signal changes from a first level to a second level to form a first delaying signal, and a second inverting sub-circuit configured to form a reset signal that is inverted from the first delaying signal. The second timing controlling circuit includes a second delaying sub-circuit configured to delay a time point of the initial signal at which the initial signal changes from the first level to the second level to form a display control signal. The first level is an inactive level of the initial signal, and the second level is an active level of the initial signal.

According to an embodiment of the present disclosure, the first delaying sub-circuit includes a first delaying unit-circuit configured to delay the time point of the first inverting signal at which the first inverting signal changes from the first level to the second level to form the first delaying signal, and a first capacitor configured to control, based on a capacitance value of the first capacitor, an amount of time by which the time point of the first inverting signal at which the first inverting signal changes from the first level to the second level is delayed.

According to an embodiment of the present disclosure, the first delaying sub-circuit further includes a first resistor for stabilizing an output of the first delaying unit-circuit.

According to an embodiment of the present disclosure, the second delaying sub-circuit includes a second delaying unit-circuit configured to delay the time point of the initial signal at which the initial signal changes from the first level to the second level to form the display control signal, and a second capacitor configured to control, based on a capacitance value of the second capacitor, an amount of time by which the time point of the initial signal at which the initial signal changes from the first level to the second level is delayed.

According to an embodiment of the present disclosure, the second delaying sub-circuit further includes a second resistor for stabilizing an output of the second delaying unit-circuit.

Another aspect of the present disclosure provides a switch timing controlling circuit, and the circuit includes: a first inverting sub-circuit, an input terminal of the first inverting sub-circuit being coupled to an initial signal terminal; a first delaying sub-circuit, an input terminal of the first delaying sub-circuit being coupled to an output terminal of the first inverting sub-circuit; a second inverting sub-circuit, an input terminal of the second inverting sub-circuit being coupled to an output terminal of the first delaying sub-circuit, and an output terminal of the second inverting sub-circuit being coupled to a first output terminal of the switch timing controlling circuit; and a second delaying sub-circuit, an input terminal of the second delaying sub-circuit being coupled to the initial signal terminal, an output terminal of the second delaying sub-circuit being coupled to a second output terminal of the switch timing controlling circuit. The first delaying sub-circuit and the second delaying sub-circuit are each configured to delay a time point of a respective signal at which the signal changes from a first level to a second level, the first level is an inactive level of an initial signal input from the initial signal terminal, and the second level is an active level of the initial signal.

According to an embodiment of the present disclosure, the first delaying sub-circuit includes a first delaying unit-circuit and a first capacitor, an input terminal of the first delaying unit-circuit is coupled to the output terminal of the first inverting sub-circuit, an output terminal of the first delaying unit-circuit is coupled to the input terminal of the second inverting sub-circuit, a control terminal of the first delaying unit-circuit is coupled to a first terminal of the first capacitor, and a second terminal of the first capacitor is coupled to a ground terminal.

According to an embodiment of the present disclosure, the first delaying sub-circuit further includes a first resistor coupled between the output terminal of the first delaying unit circuit and a power supply voltage terminal.

According to an embodiment of the present disclosure, the second delaying sub-circuit includes a second delaying unit-circuit and a second capacitor, an input terminal of the second delaying unit circuit is coupled to the initial signal terminal, an output terminal of the second delaying unit-circuit is coupled to a second output terminal of the switch timing controlling circuit, a control terminal of the second delaying unit-circuit is coupled to a first pole of the second capacitor, and a second pole of the second capacitor is coupled to a grounding terminal.

According to an embodiment of the present disclosure, the second delaying sub-circuit further includes a second resistor coupled between the output terminal of the second delaying unit-circuit and a power supply voltage terminal.

According to an embodiment of the present disclosure, the first inverting sub-circuit includes a first transistor and a second transistor, a gate electrode of the first transistor is coupled to the initial signal terminal, a first electrode of the first transistor is coupled to a power supply voltage terminal, a second electrode of the first transistor is coupled to the input terminal of the first delaying sub-circuit, a gate electrode of the second transistor is coupled to the initial signal terminal, a first electrode of the second transistor is coupled to the input terminal of the first delaying sub-circuit, a second electrode of the second transistor is coupled to a ground terminal, the first transistor is one of an N-type transistor and a P-type transistor, and the second transistor is the other of the N-type transistor and the P-type transistor.

According to an embodiment of the present disclosure, the second inverting sub-circuit includes a third transistor and a fourth transistor, a gate electrode of the third transistor is coupled to the output terminal of the first delaying sub-circuit, a first electrode of the third transistor is coupled to a power supply voltage terminal, a second electrode of the third transistor is coupled to the first output terminal, a gate electrode of the fourth transistor is coupled to the output terminal of the first delaying sub-circuit, a first electrode of the fourth transistor is coupled to the first output terminal, a second electrode of the fourth transistor is coupled to a ground terminal, and the third transistor is one of an N-type transistor and a P-type transistor, and the fourth transistor is the other of the N-type transistor and the P-type transistor.

Another aspect of the present disclosure provides a switch timing controlling method that is applied to the switch timing controlling circuits described above, the switch timing controlling method includes: inputting an initial signal through an initial signal terminal, forming a first inverting signal by inverting the initial signal by the first inverting sub-circuit; forming a first delaying signal by delaying, by the first delaying sub-circuit, a time point of the first inverting signal at which the first inverting signal changes from a first level to a second level; forming a reset signal by inverting the first delaying signal by the second inverting sub-circuit, and outputting the reset signal; and forming a display control signal by delaying, by the second delaying sub-circuit, a time point of the initial signal at which the initial signal changes from the first level to the second level, and then outputting the display control signal.

Another aspect of the present disclosure provides a display device including the switch timing controlling circuits described above.

According to an embodiment of the present disclosure, the display device is an on-vehicle display device, and a control terminal of the on-vehicle display device is coupled to the initial signal terminal.

BRIEF DESCRIPTION OF THE DRAWINGS

The accompanying drawings are included to provide a further understanding of the present disclosure, constitute a part of the specification, explain the disclosure together with embodiments of the present disclosure, but do not limit the present disclosure. In the accompanying drawings.

DETAILED DESCRIPTION

In order that those skilled in the art will better understand technical solutions of the present disclosure, the present disclosure is further described with reference to the accompanying drawings and specific embodiments.

The present disclosure will be described in more detail below with reference to the accompanying drawings. Like elements are denoted by like reference numerals throughout the accompanying drawings. For the sake of clarity, various parts in the accompanying drawings are not drawn to scale. Moreover, certain well-known parts may not be shown in the accompanying drawings.

Many specific details of the present disclosure, such as structures, materials, dimensions, treatment processes and techniques of components, are set forth in the following description in order to provide a clearer understanding of the present disclosure. However, as will be understood by those skilled in the art, the present disclosure may be practiced not according to the specific details.

Figure 1:
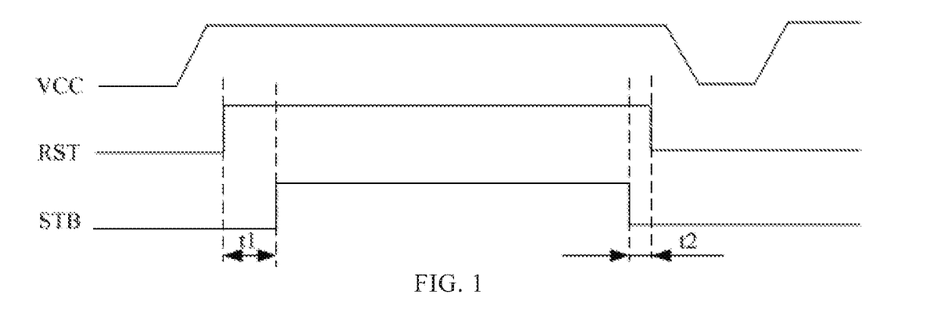
FIG. 1 is a signal timing diagram of an on-vehicle display device.

FIG. 1 is a signal timing diagram of an on-vehicle display device.

In order to prevent problems such as abnormal display of an on-vehicle display device, a reset signal RST and a display control signal STB for controlling turning on and off of the on-vehicle display device need to satisfy a timing as shown in FIG. 1. That is, when the display device is turned on, the display control signal STB is required to change to a high level after a delay of time period t1 from a time point at which the reset signal RST changes to the high level, and when the display device is turned off, the reset signal RST is required to change to a low level after a delay of time period t2 from a time point at which the display control signal STB changes to the low level. In FIG. 1, VCC denotes a voltage signal that may be output at a power supply terminal of the display device.

Figure 2:
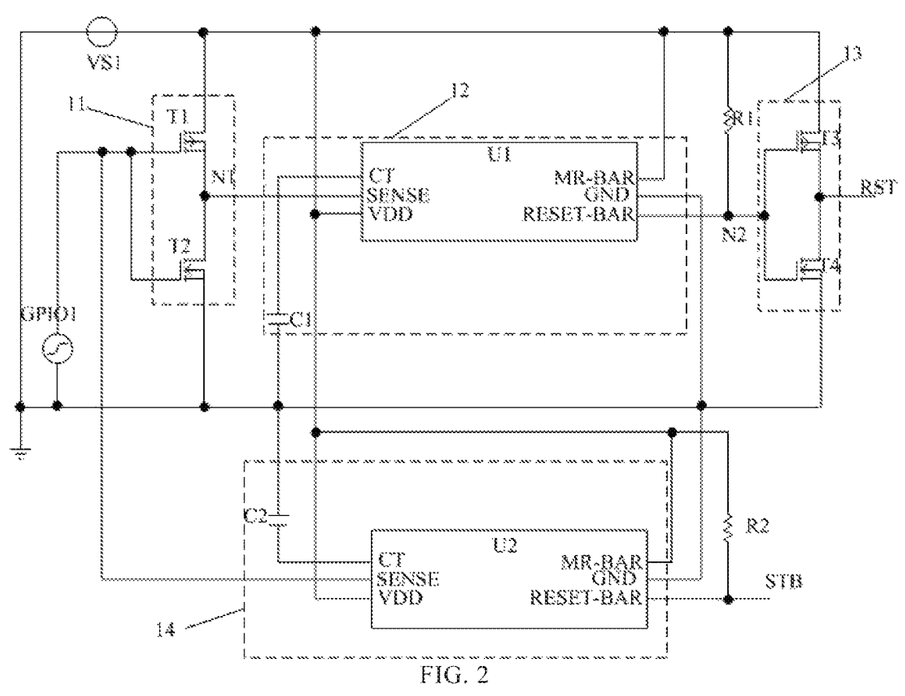
FIG. 2 is a schematic circuit diagram of a switch timing controlling circuit according to an embodiment of the present disclosure.
Figure 3:
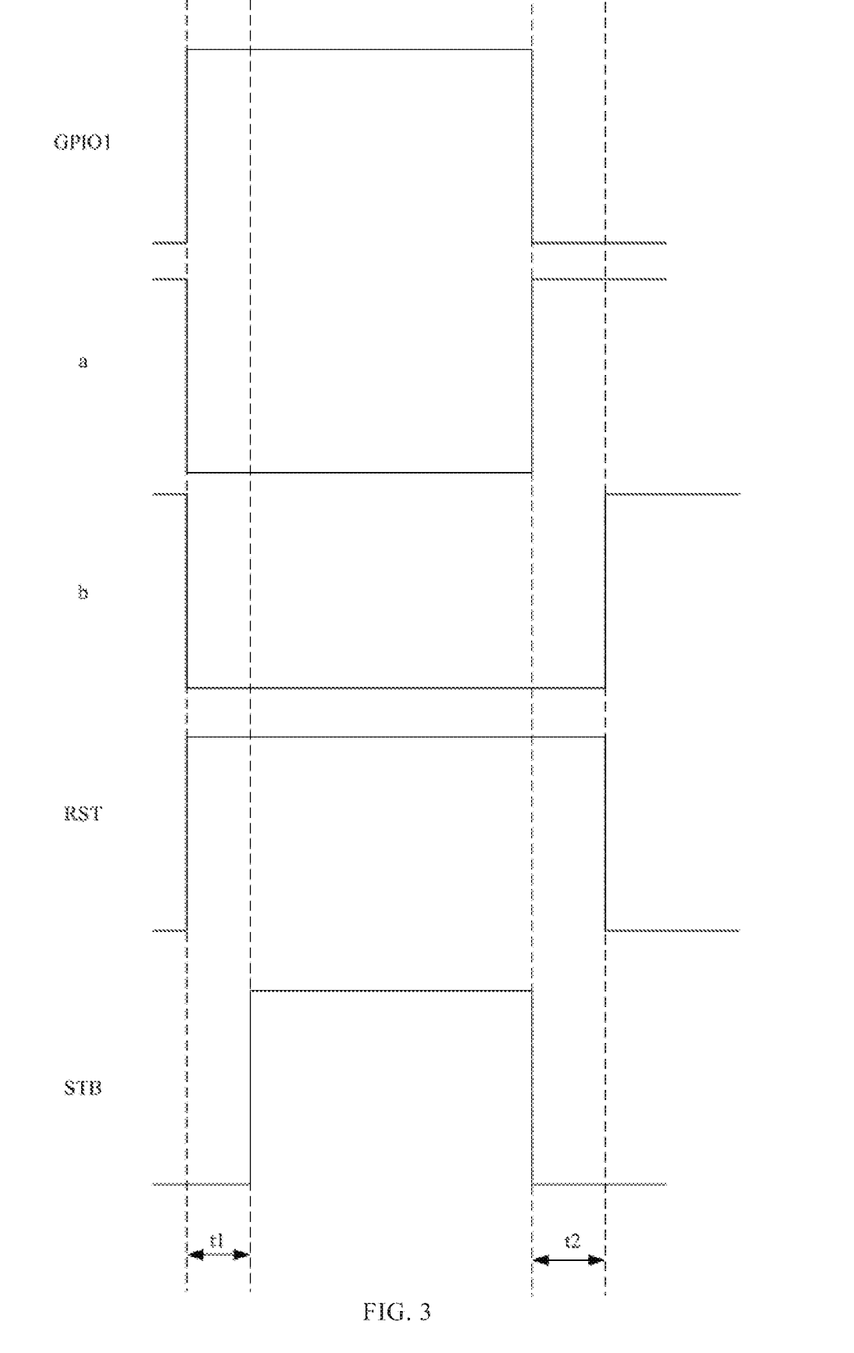
FIG. 3 is a timing diagram of various signals in a switch timing controlling circuit according to an embodiment of the present disclosure.

FIG. 2 is a schematic circuit diagram of a switch timing controlling circuit according to an embodiment of the present disclosure, and FIG. 3 is a timing diagram of various signals in the switch timing controlling circuit according to an embodiment of the present disclosure.

As shown in FIGS. 2 and 3, a switch timing controlling circuit according to an embodiment of the present disclosure includes a first timing controlling circuit and a second timing controlling circuit.

The first timing controlling circuit includes a first inverting sub-circuit 11, a first delaying sub-circuit 12 and a second inverting sub-circuit 13.

The first inverting sub-circuit 11 is configured to form a first inverting signal 'a' that is inverted from an initial signal input from an initial signal terminal GPIO1.

An inactive level of the initial signal is a first level, e.g., a low level, and an active level of the initial signal is a second level, e.g., a high level. As shown in FIG. 3, the initial signal has a form of the first level-the second level-the first level, and the first inverting signal 'a' having a form inverted from the initial signal has a form of the second level-the first level-the second level. Although FIG. 3 shows that the first level is a low level and the second level is a high level, the present disclosure is not limited thereto, and the first level may be a high level and the second level may be a low level.

The first delaying sub-circuit 12 is configured to delay a time point of the first inverting signal 'a' at which the first inverting signal 'a' changes from the first level to the second level to form a first delaying signal 'b'. As shown in FIG. 3, the first delaying signal 'b' also has the form of the second level-the first level-the second level, but a time point of the first delaying signal 'b' at which the first delaying signal 'b' changes from the first level to the second level is delayed as compared to the time point of the first inverting signal 'a' at which the first inverting signal 'a' changes from the first level to the second level. A time point of the first delaying signal 'b' at which the first delaying signal 'b' changes from the second level to the first level is substantially the same as a time point of the first inverting signal 'a' at which the first inverting signal 'a' changes from the second level to the first level, and substantially the same as a time point of the initial signal at which the initial signal changes from the first level to the second level.

The second inverting sub-circuit 13 is configured to form a reset signal RST that is inverted from the first delaying signal 'b'. As shown in FIG. 3, the reset signal RST has the form of the first level-the second level-the first level, but a time point (i.e., an inactive time point) of the reset signal RST at which the reset signal RST changes from the second level to the first level is delayed as compared to a time point of the initial signal at which the initial signal changes from the second level to the first level. A time point of the reset signal RST at which the reset signal RST changes from the first level to the second level is substantially the same as the time point of the initial signal at which the initial signal changes from the first level to the second level.

The second timing controlling circuit includes a second delaying sub-circuit 14.

The second delaying sub-circuit 14 is configured to delay the time point of the initial signal at which the initial signal changes from the first level to the second level to form a display control signal STB. As shown in FIG. 3, the display control signal STB also has the form of the first level-the second level-the first level, but a time point (i.e., an active time point) of the display control signal STB at which the display control signal STB changes from the first level to the second level is delayed as compared to the time point of the initial signal at which the initial signal changes from the first level to the second level. A time point of the display control signal STB at which the display control signal STB changes from the second level to the first level is substantially the same as the time point of the initial signal at which the initial signal changes from the second level to the first level.

An amount of time by which the active time point of the display control signal STB is delayed should be less than a pulse width of the initial signal.

In the switch timing controlling circuit according to the embodiment of the present disclosure, the active time point of the output reset signal RST is earlier than that of the output display control signal STB, and the inactive time point of the reset signal RST is later than that of the display control signal STB.

That is, both of the reset signal RST and the display control signal STB may be formed based on the initial signal input from the initial signal terminal GPIO1, and the two signals satisfy a condition that the active time point of the reset signal RST is earlier than that of the display control signal STB and the inactive time point of the reset signal RST is later than that of the display control signal STB.

As shown in FIG. 3, the active time point of the reset signal RST is a period of t1 earlier than the active time point of the display control signal STB, and the inactive time point of the reset signal RST is a period of t2 later than the inactive time point of the display control signal STB.

The switch timing controlling circuit according to the embodiment of the present disclosure may form two signals including the reset signal RST and the display control signal STB based on the initial signal input from the initial signal terminal GPIO1, and the two signals satisfy the condition that the active time point of the reset signal RST is earlier than the active time point of the display control signal STB and the inactive time point of the reset signal RST is later than the inactive time point of the display control signal STB, so that the on-vehicle display device with the switch timing controlling circuit may simultaneously form the reset signal RST and the display control signal STB even if only one control port is provided, and display performance of the on-vehicle display device may be satisfied.

Referring back to FIG. 2, an input terminal of the first inverting sub-circuit 11 is coupled to the initial signal terminal GPIO1, an output terminal of the first inverting sub-circuit 11 is coupled to an input terminal of the first delaying sub-circuit 12, and the output terminal of the first inverting sub-circuit 11 and the input terminal of the first delaying sub-circuit 12 may be represented by a first node N1.

An output terminal of first delaying sub-circuit 12 is coupled to an input terminal of the second inverting sub-circuit 13, and the output terminal of first delaying sub-circuit 12 and the input terminal of second inverting sub-circuit 13 may be represented by a second node N2.

An output terminal of the second inverting sub-circuit 13 is coupled to a first output terminal, i.e., a reset signal output terminal, of the switch timing controlling circuit.

An input terminal of the second delaying sub-circuit 14 is coupled to the initial signal terminal GPIO1, and an output terminal of the second delaying sub-circuit 14 is coupled to a second output terminal, i.e., a display control signal output terminal, of the switch timing controlling circuit.

The first inverting sub-circuit 11 includes a first transistor T1 and a second transistor T2.

A gate electrode of the first transistor T1 is coupled to the initial signal terminal GPIO1, a first electrode of the first transistor T1 is coupled to a power supply voltage terminal VS1, and a second electrode of the first transistor T1 is coupled to the first node N1.

The power supply voltage terminal VS1 is configured to provide a power supply voltage signal.

A gate electrode of the second transistor T2 is coupled to the initial signal terminal GPIO1, a first electrode of the second transistor T2 is coupled to the first node N1, and a second electrode of the second transistor T2 is coupled to a ground terminal.

The first transistor T1 is an N-type transistor and the second transistor T2 is a P-type transistor; alternatively, the first transistor T1 is a P-type transistor and the second transistor T2 is an N-type transistor.

The second inverting sub-circuit 13 includes a third transistor T3 and a fourth transistor T4.

A gate electrode of the third transistor T3 is coupled to the second node N2, a first electrode of the third transistor T3 is coupled to the power supply voltage terminal VS1, and a second electrode of the third transistor T3 is coupled to the reset signal output terminal.

A gate electrode of the fourth transistor T4 is coupled to the second node N2, a first electrode of the fourth transistor T4 is coupled to the reset signal output terminal, and a second electrode of the fourth transistor T4 is coupled to the ground terminal.

The third transistor T3 is an N-type transistor and the fourth transistor T4 is a P-type transistor; alternatively, the third transistor T3 is a P-type transistor and the fourth transistor T4 is an N-type transistor.

The first delaying sub-circuit 12 includes a first delaying unit-circuit U1 and a first capacitor C1.

An input terminal SENSE of the first delaying unit-circuit U1 is coupled to the first node N1, a power supply terminal VDD of the first delaying unit-circuit U1 is coupled to the power supply voltage terminal VS1, and an output terminal RESET-BAR of the first delaying unit-circuit U1 is coupled with the second node N2.

The first delaying unit-circuit U1 is configured to delay the time point of the first inverting signal 'a' at which the first inverting signal 'a' changes from the first level to the second level to form the first delaying signal 'b'.

The first delaying unit-circuit U1 may be formed by an integrated chip (e.g., a delaying chip) product or a separate circuit, or by other suitable sub-circuits, and is configured to adjust delayed time of a signal such that required timing becomes adjustable. The first delaying unit-circuit U1 may further include terminals such as a ground terminal GND and a regulation terminal MR-BAR, for example.

A first terminal of the first capacitor C1 is coupled to a control terminal CT of the first delaying unit-circuit U1, and a second terminal of the first capacitor C1 is coupled to the ground terminal.

The first-capacitor C1 is configured to adjust a delay degree of the first delaying unit-circuit U1 based on a capacitance value of the first capacitor C1. That is, the first capacitor C1 may control an amount of time by which the time point of the first inverting signal 'a' at which the first inverting signal 'a' changes from the first level to the second level is delayed based on the capacitance value of the first capacitor C1.

The first delaying sub-circuit 12 may further include a first resistor R1 coupled between the second node N2 and the power supply voltage terminal VS1, and the first delaying sub-circuit 12 may stabilize an output of the first delaying sub-circuit 12, that is, the first delaying signal 'b', by serving as a pull-up resistor.

The second delaying sub-circuit 14 includes a second delaying unit-circuit U2 and a second capacitor C2.

An input terminal SENSE of the second delaying unit-circuit U2 is coupled to the initial signal terminal GPIO1, a power supply terminal VDD of the second delaying unit-circuit U2 is coupled to the power supply voltage terminal VS1, and an output terminal RESET-BAR of the second delaying unit-circuit U2 is coupled to the display control signal output terminal.

The second delaying unit-circuit U2 is configured to delay the time point of the initial signal at which the initial signal changes from the first level to the second level to form the display control signal STB.

The second delaying unit-circuit U2 may be a delaying chip, or may be formed by an integrated chip (e.g., a delaying chip) product or a separate circuit, or may be formed by other suitable sub-circuits, and is configured to adjust delayed time of a signal such that required timing becomes adjustable. The second delaying unit-circuit U2 may also include terminals such as a ground terminal GND and a regulation terminal MR-BAR, for example.

A first terminal of the second capacitor C2 is coupled to a control terminal of the second delaying unit-circuit U2, and a second terminal of the second capacitor C2 is coupled to the ground terminal.

The second capacitor C2 is configured to adjust a delay degree of the second delaying unit-circuit U2 based on a capacitance value of the second capacitor C2. That is, the second capacitor C2 may control an amount of time by which the time point of the initial signal 'a' at which the initial signal changes from the first level to the second level is delayed based on the capacitance value of the second capacitor C2.

A difference between the active time point of the reset signal RST and the active time point of the display control signal STB, i.e., t1 in FIG. 3, and a difference between the inactive time point of the reset signal RST and the inactive time point of the display control signal STB, i.e., t2 in FIG. 3, may be adjusted by the first capacitor C1 and the second capacitor C2, so that an applicable range of the switch timing controlling circuit is expanded.

The second delaying sub-circuit 14 may further include a second resistor R2 coupled between the output terminal of the second delaying sub-circuit 14 and the power supply voltage terminal VS1, and the second resistor R2 may stabilize an output of the second delaying sub-circuit 14, that is, the display control signal STB, by serving as a pull-up resistor.

The present disclosure also provides a switch timing controlling method, which is applied to the switch timing controlling circuit described above. The method includes: inputting the initial signal through the initial signal terminal GPIO1; forming the first inverting signal 'a' by inverting the initial signal by the first inverting sub-circuit 11; forming the first delaying signal 'b' by delaying, by the first delaying sub-circuit 12, the time point of the first inverting signal 'a' at which the first inverting signal 'a' changes from the first level to the second level; forming the reset signal RST by inverting the first delaying signal 'b' by the second inverting sub-circuit 13 and then output the reset signal RST; forming the display control signal STB by delaying, by the second delaying sub-circuit 14, the time point of the initial signal at which the initial signal changes from the first level to the second level, and then output the display control signal STB.

According to an embodiment of the present disclosure, the initial signal may be an alternating current (AC) signal.

The initial signal may control turning on and off of the first transistor T1 and the second transistor T2. In the following, the description is made by taking a case where the first transistor T1 is a P-type transistor and the second transistor T2 is an N-type transistor as an example. That is, when the initial signal has the first level (e.g., a low level), the first transistor T1 is turned on and the second transistor T2 is turned off, and when the initial signal has the second level (e.g., a high level), the first transistor T1 is turned off and the second transistor T2 is turned on. Similarly, in the following, the description is made by taking a case where the third transistor T3 is a P-type transistor and the fourth transistor T4 is an N-type transistor as an example.

When the first transistor T1 is turned on and the second transistor T2 is turned off, a first signal input through the power supply voltage terminal VS1 is written to the first node N1, and the first node N1 has the high level. When the first transistor T1 is turned off and the second transistor T2 is turned on, a ground signal input through the ground terminal is written to the first node N1, and the first node N1 has the low level. Meanwhile, the level of the first signal is the same as the second level of the initial signal, and the level of the ground signal is the same as the first level of the initial signal.

As shown in FIG. 3, when the initial signal is an AC signal having the form of the first level-the second level-the first level, a signal at the first node N1 is shown to have a form of the ground signal-the first signal-the ground signal (the high level-the low level-the high level), and since the level of the first signal is the same as the second level of the initial signal and the level of the ground signal is the same as the first level of the initial signal, at this time, the signal at the first node N1 is inverted from the initial signal, that is, the first inverting signal 'a' is formed. The first inverting signal 'a' is then written into the first delaying sub-circuit 12, and the first delaying sub-circuit 12 delays the time point of the first inverting signal 'a' at which the first inverting signal 'a' changes from the first level to the second level, i.e., the time point of the first inverting signal 'a' at which the first inverting signal 'a' changes from the first level to the second level is delayed for a period of t2, to form the first delaying signal 'b', and the first delaying signal 'b' is output to the second node N2. Since the first delaying signal 'b' at the second node N2 has the form of the second level-the first level-the second level, the reset signal RST output by the second inverting sub-circuit 13 has the form of the first level-the second level-the first level that is inverted from the first delaying signal 'b'. Finally, delaying of the time point of the initial signal at which the initial signal changes from the first level to the second level is completed to form the reset signal RST.

An output process of the display control signal STB includes transmitting the initial signal input from the initial signal terminal GPIO1 to the second delaying sub-circuit 14, and delaying, by the second delaying sub-circuit 14, the time point of the initial signal at which the initial signal changes from the first level to the second level to form the display control signal STB.

The output process of the reset signal RST and the display control signal STB further includes inputting the first signal through the power supply voltage terminal VS1, grounding the ground terminal, and inputting the initial signal through the initial signal terminal GPIO1.

For example, when the initial signal is an AC signal having the form of the first level-the second level-the first level and the initial signal is written into the second delaying sub-circuit 14, since the second delaying sub-circuit 14 may only delay a time point of a signal at which the signal changes from the first level to the second level, so the time point of the initial signal at which the initial signal changes from the first level to the second level is delayed for a period of t1 to form the display control signal STB.

As described above, the reset signal RST and the display control signal STB may be formed through only one initial signal terminal GPIO1, and an active time point of the reset signal RST is formed earlier than an active time point of the display control signal STB, and an inactive time point of the reset signal RST is formed later than an inactive time of the display control signal STB, that is, as shown in FIG. 3, the active time point of the reset signal RST is a period of t1 earlier than the active time point of the display control signal STB, and the inactive time point of the reset signal RST is a period of t2 later than the inactive time point of the display control signal STB, thereby ensuring display performance of an on-vehicle display device having the switch timing controlling circuit.

The present disclosure further provides a display device including the switch timing controlling circuit according to the foregoing embodiments.

According to an embodiment of the present disclosure, the display device is an on-vehicle display device, and a control terminal of the on-vehicle display device is coupled to the initial signal terminal GPIO1.

It should be noted that each on-vehicle display device has only one control terminal. The on-vehicle display device usually requires the switch timing to meet the timing as shown in FIG. 1, that is, when the on-vehicle display device is turned on, the display control signal STB needs to change to the active level after the delay of time period t1 from the time point at which the reset signal RST changes to the active level, and when the on-vehicle display device is turned off, the reset signal RST need to change to the inactive level after the delay of time period t2 from the time point at which the display control signal STB changes to the inactive level. The display device according to the embodiment of the present application may meet the above display requirements of the on-vehicle display device.

It should be noted that, ordinal terms such as first and second, and the like herein are used solely to distinguish one entity or action from another entity or action without necessarily requiring or implying any actual relationship or order between the entities or actions. Also, terms "comprise/comprising", "include/including" or any other variation thereof are intended to cover a non-exclusive inclusion, such that a process, method, article, or apparatus that comprises a list of elements does not include only the elements but may include other elements not expressly listed or inherent to such process, method, article, or apparatus. Without further limitation, an element defined by a phrase "includes an . . . " does not exclude presence of other identical elements in the process, method, article, or apparatus that includes the element.

In accordance with the descriptions of the embodiments of the present disclosure, the embodiments are not intended to be exhaustive or to limit the present disclosure to the described specific embodiments. Obviously, many modifications and variations are possible in light of the above descriptions. The embodiments were chosen and described in order to best explain the principles of the present disclosure and the practical application, thereby enable those skilled in the art to best utilize the present disclosure and modify the present disclosure. The present disclosure is to be limited only by the claims and their full scope and equivalents.

The invention claimed is:

1. A switch timing controlling circuit, comprising: a first timing controlling circuit and a second timing controlling circuit, wherein the first timing controlling circuit comprises: a first inverting sub-circuit configured to form a first inverting signal that is inverted from an initial signal input from an initial signal terminal; a first delaying sub-circuit configured to delay a time point of the first inverting signal at which the first inverting signal changes from a first level to a second level to form a first delaying signal; and a second inverting sub-circuit configured to form a reset signal that is inverted from the first delaying signal; the second timing controlling circuit comprises: a second delaying sub-circuit configured to delay a time point of the initial signal at which the initial signal changes from the first level to the second level to form a display control signal, wherein the first level is an inactive level of the initial signal, and the second level is an active level of the initial signal, wherein the first delaying sub-circuit comprises: a first delaying unit-circuit configured to delay the time point of the first inverting signal at which the first inverting signal changes from the first level to the second level to form the first delaying signal; and a first capacitor configured to control, based on a capacitance value of the first capacitor, an amount of time by which the time point of the first inverting signal at which the first inverting signal changes from the first level to the second level is delayed.

2. The switch timing controlling circuit of claim 1, wherein the first delaying sub-circuit further comprises a first resistor for stabilizing an output of the first delaying unit-circuit.

3. The switch timing controlling circuit of claim 1, wherein the second delaying sub-circuit comprises: a second delaying unit-circuit configured to delay the time point of the initial signal at which the initial signal changes from the first level to the second level to form the display control signal; and a second capacitor configured to control, based on a capacitance value of the second capacitor, an amount of time by which the time point of the initial signal at which the initial signal changes from the first level to the second level is delayed.

4. The switch timing controlling circuit of claim 3, wherein the second delaying sub-circuit further comprises a second resistor for stabilizing an output of the second delaying unit-circuit.

5. A switch timing controlling method, the switch timing controlling method being applied to the switch timing controlling circuit of claim 1, the switch timing controlling method comprising: inputting the initial signal through the initial signal terminal, forming the first inverting signal by inverting the initial signal by the first inverting sub-circuit, forming the first delaying signal by delaying, by the first delaying sub-circuit, the time point of the first inverting signal at which the first inverting signal changes from the first level to the second level, forming the reset signal by inverting the first delaying signal by the second inverting sub-circuit, and outputting the reset signal; and forming the display control signal by delaying, by the second delaying sub-circuit, the time point of the initial signal at which the initial signal changes from the first level to the second level, and outputting the display control signal.

6. A display device, comprising the switch timing controlling circuit of claim 1.

7. The display device of claim 6, wherein the display device is an on-vehicle display device, and a control terminal of the on-vehicle display device is coupled to the initial signal terminal.

8. A switch timing controlling circuit, comprising: a first inverting sub-circuit, an input terminal of the first inverting sub-circuit being coupled to an initial signal terminal; a first delaying sub-circuit, an input terminal of the first delaying sub-circuit being coupled to an output terminal of the first inverting sub-circuit; a second inverting sub-circuit, an input terminal of the second inverting sub-circuit being coupled to an output terminal of the first delaying sub-circuit, and an output terminal of the second inverting sub-circuit being coupled to a first output terminal of the switch timing controlling circuit; and a second delaying sub-circuit, an input terminal of the second delaying sub-circuit being coupled to the initial signal terminal, an output terminal of the second delaying sub-circuit being coupled to a second output terminal of the switch timing controlling circuit, wherein the first delaying sub-circuit and the second delaying sub-circuit are each configured to delay a time point of a respective signal at which the signal changes from a first level to a second level, the first level is an inactive level of an initial signal input from the initial signal terminal, and the second level is an active level of the initial signal, wherein the first delaying sub-circuit comprises a first delaying unit-circuit and a first capacitor, an input terminal of the first delaying unit-circuit is coupled to the output terminal of the first inverting sub-circuit, an output terminal of the first delaying unit-circuit is coupled to the input terminal of the second inverting sub-circuit, a control terminal of the first delaying unit-circuit is coupled to a first terminal of the first capacitor, and a second terminal of the first capacitor is coupled to a ground terminal.

9. The switch timing controlling circuit of claim 8, wherein
the first delaying sub-circuit further comprises a first resistor coupled between the output terminal of the first delaying unit circuit and a power supply voltage terminal.

10. The switch timing controlling circuit of claim 8, wherein the second delaying sub-circuit comprises a second delaying unit-circuit and a second capacitor, an input terminal of the second delaying unit circuit is coupled to the initial signal terminal, an output terminal of the second delaying unit-circuit is coupled to a second output terminal of the switch timing controlling circuit, a control terminal of the second delaying unit-circuit is coupled to a first terminal of the second capacitor, and a second terminal of the second capacitor is coupled to a grounding terminal.

11. The switch timing controlling circuit of claim 10, wherein the second delaying sub-circuit further comprises a second resistor coupled between the output terminal of the second delaying unit-circuit and a power supply voltage terminal.

12. The switch timing controlling circuit of claim 8, wherein the first inverting sub-circuit comprises a first transistor and a second transistor, a gate electrode of the first transistor is coupled to the initial signal terminal, a first electrode of the first transistor is coupled to a power supply voltage terminal, and a second electrode of the first transistor is coupled to the input terminal of the first delaying sub-circuit,
a gate electrode of the second transistor is coupled to the initial signal terminal, a first electrode of the second transistor is coupled to the input terminal of the first delaying sub-circuit, and a second electrode of the second transistor is coupled to a ground terminal, and the first transistor is one of an N-type transistor and a P-type transistor, and the second transistor is the other of the N-type transistor and the P-type transistor.

13. The switch timing controlling circuit of claim 8, wherein the second inverting sub-circuit comprises a third transistor and a fourth transistor, a gate electrode of the third transistor is coupled to the output terminal of the first delaying sub-circuit, a first electrode of the third transistor is coupled to a power supply voltage terminal, and a second electrode of the third transistor is coupled to the first output terminal, a gate electrode of the fourth transistor is coupled to the output terminal of the first delaying sub-circuit, a first electrode of the fourth transistor is coupled to the first output terminal, and a second electrode of the fourth transistor is coupled to a ground terminal, and the third transistor is one of an N-type transistor and a P-type transistor, and the fourth transistor is the other of the N-type transistor and the P-type transistor.

14. A switch timing controlling method, the switch timing controlling method being applied to the switch timing controlling circuit of claim 8, the switch timing controlling method comprises: inputting the initial signal through the initial signal terminal, forming a first inverting signal by inverting the initial signal by the first inverting sub-circuit, forming a first delaying signal by delaying, by the first delaying sub-circuit, a time point of the first inverting signal at which the first inverting signal changes from the first level to the second level, forming a reset signal by inverting the first delaying signal by the second inverting sub-circuit, and outputting the reset signal; and forming a display control signal by delaying, by the second delaying sub-circuit, a time point of the initial signal at which the initial signal changes from the first level to the second level, and outputting the display control signal.

15. A display device, comprising the switch timing controlling circuit of claim 8.

16. The display device of claim 15, wherein the display device is an on-vehicle display device, and a control terminal of the on-vehicle display device is coupled to the initial signal terminal.

* * * * *